United States Patent [19]

Kegg

[11] Patent Number: 4,457,045
[45] Date of Patent: Jul. 3, 1984

[54] CASTOR HAVING INWARDLY CAMBERED WHEELS AND A RETAINER PLATE

[76] Inventor: Jack P. Kegg, Unit 12, 104 St. George Crescent, Drummoyne, New South Wales 2047, Australia

[21] Appl. No.: 415,312

[22] Filed: Sep. 7, 1982

[30] Foreign Application Priority Data

Sep. 17, 1981 [AU] Australia .............................. PF0796

[51] Int. Cl.³ .......................................... B60B 33/00
[52] U.S. Cl. ............................. 16/18 A; 16/18 CG; 16/48; 188/1.12; 188/70 R
[58] Field of Search ............. 16/18 A, 18 CG, 31 R, 16/31 A, 35 R, 37, 38, 39, 47, 48; 188/1.12, 70 R, 72.7

[56] References Cited

U.S. PATENT DOCUMENTS

| | | | |
|---|---|---|---|
| 690,762 | 1/1902 | Papenfus | 16/18 A |
| 767,212 | 8/1904 | Dornauf | 16/18 A |
| 1,936,701 | 11/1933 | Wilson | 16/18 A |
| 1,940,823 | 12/1933 | Shinn | 16/18 A |
| 2,170,257 | 8/1939 | Andersen | 16/21 X |
| 3,914,821 | 10/1975 | Screen | 16/35 R |
| 3,922,754 | 12/1975 | Andersen | 16/47 X |
| 4,076,266 | 2/1978 | Krausz | 188/72.7 X |
| 4,161,803 | 7/1979 | Propst et al. | 16/18 A |
| 4,333,207 | 6/1982 | Atwood | 188/1.12 |

FOREIGN PATENT DOCUMENTS

| | | |
|---|---|---|
| 449886 | 9/1971 | Australia . |
| 516597 | 6/1981 | Australia . |
| 2001133 | 7/1971 | Fed. Rep. of Germany .......... 16/38 |
| 1427653 | 1/1966 | France . |
| 239701 | 9/1925 | United Kingdom . |
| 928709 | 6/1963 | United Kingdom . |

*Primary Examiner*—Fred Andrew Silverberg
*Attorney, Agent, or Firm*—Fulwider, Patton, Rieber, Lee & Utecht

[57] ABSTRACT

A swivel castor comprises a pair of wheels (17) inclined inwardly to the upstanding swivel axis (11), such that the bottom of the wheels are spaced apart further than the tops. The swivel axis is offset forwardly of the wheel rotational axes. The arrangement gives improved support capacity and swivellability.

7 Claims, 3 Drawing Figures

CASTOR HAVING INWARDLY CAMBERED WHEELS AND A RETAINER PLATE

BACKGROUND OF THE INVENTION

The present invention provides a castor having a pair of wheels, which features good load-carrying capacity and improved swivellability.

DESCRIPTION OF THE PRIOR ART

Conventional swivel-type castors frequently suffer from drawbacks which tend to limit their usefulness or reliability. One such drawback which is particularly evident in castors of simple construction and especially in castors with worn bearings is a tendency to jerk, or a lack of smooth action during movement. Another drawback which can occur even with castors in good condition, and which to various degrees is inherent in castor designs generally, is a resistance to sudden large directional changes of movement. In extreme instances, a castor can exhibit a tendency to lock in the direction of movement of a load, making turning difficult, especially when the bearings are worn and the load is heavy. The tendency to lock is usually most pronounced in simple castors with little or no offset between swivel and wheel axes, and for castors with two or more wheels in which turning friction is significant compared with rolling friction. With the very simple castor designs the tendency to lock is mainly evident for turning angles near 90° while for castors which have their swivel and wheel axes offset from each other, locking is most likely to occur for turning angles near 180°. The tendency for locking to occur is generally minimised in swivel castors by having the swivel axes offset from the wheel axes.

One known type of castor, such as disclosed in British Patent No. 928,709, achieves a high mobility compared with other known types by having a wheel mounted at a camber angle relative to the swivel axis. In this type of castor the direction of camber is outward with respect to the swivel axis. By this is meant that if the castor is viewed in the direction of travel on a horizontal support surface, the lowermost tip of the castor would be seen closer to the swivel axis than the uppermost tip. In particular, the lowermost tip, which contacts the support surface, would be seen to be substantially in line with the swivel axis. In a transverse view, the wheel axis would be seen to be offset behind the swivel axis. Despite its advantages, this type of castor does have some limitations. For example, the castor is inherently asymmetrical in the relationship between the wheel and the swivel axis and it is essential that castors of this type be manufactured and mounted in complementary pairs, otherwise smoothness of operation and stability are adversely affected.

It has been proposed to improve the load-carrying capacity of castors by providing a pair of wheels. However, the use of two wheels increases the sidways frictional forces between the castor and the floor, and tends to make swivelling more difficult.

The wheels have generally been mounted upright or cambered outwardly with respect to each other i.e. the bottoms of the wheels are more closely spaced than the tops. Such outwardly cambered arrangements are disclosed in U.K. Patent Nos. 239,701 and 928,709, U.S. Pat. No. 3,922,754, and Australian Patent Nos. 449,886 and 516,597. However, as acknowledged in the former Australian patent, such arrangements require a certain force to start turning motion; and moreover the close spacing of the wheels where they contact the floor leads to twisting forces which may tend to damage carpets and other floor coverings.

It is an object of the present invention to provide a twin wheel castor of improved swivellability and less resistance to turning.

The present invention provides a castor which comprises a pair of wheels rotatably supported by a support member, the support member being swivellable about an upstanding swivel axis, and each wheel having an inward camber relative to a plane containing the swivel axis such that the uppermost portions of the wheels are closer together than the lowermost portions.

The castor can give a high degree of mobility and smoothness of operation and can be easily manufactured. Among other features obtainable with the invention are substantial freedom from locking, outstanding ease in changing direction of movement under load and good load supporting capability. Other features include low drag on most surfaces, fast turning action, exceptional stability due to the relatively wide spacing of the wheels where they contact the floor, and non-critical tolerances in manufacture. The castor of the invention can readily be manufactured with a symmetrical construction and thereby avoids the disadvantage of asymmetrical castor types which must be mounted in complementary pairs for stability.

By inward camber is meant, in this context, that the wheels are inclined towards a plane which contains the swivel axis and passes between the wheels such that, when the castor is mounted for movement along a horizontal support surface, the tips of the wheels furthest from the support surface are closer to each other than the tips which are in contact with the support surface.

Preferably the swivel axis is offset with respect to the axes of the wheels, that is, it does not intersect the wheel axes.

In a preferred embodiment of the invention, the wheels are positioned symmetrically with respect to a central plane which contains the swivel axis and are supported for rotation by integral trunnions which are journalled in corresponding bearing recesses in the support member.

The edges of the wheels may be rounded or bevelled so as to lie flush on a flat surface.

The invention will be more fully understood from the following description, which is by way of example, with reference to the accompanying drawings, in which:

DESCRIPTION OF THE PREFERRED EMBODIMENT

Figure 1:
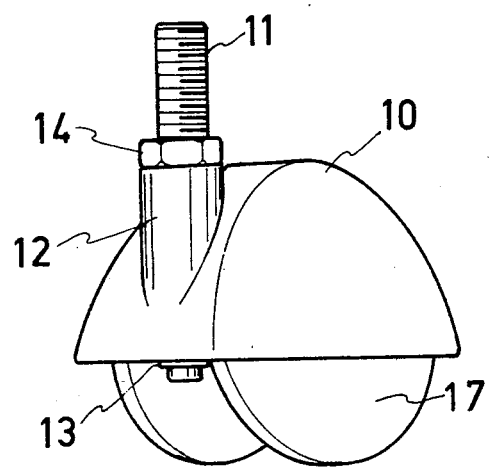
FIG. 1 is a perspective view of a castor in accordance with the preferred embodiment of the invention.

The castor shown in the drawing comprises a support member in the form of a cast metal or plastics casing 10 which is mountable by means of a threaded swivel pintle 11 to an article (not shown) such as a trolley or a piece of furniture. The pintle 11 is fitted into a bearing socket 12 which is cast integrally with the casing, and is retained therein by means of a circlip 13 and a hexagonal nut 14. The circlip 13 engages a groove 15 at one end of the pintle which projects below the bottom of the casing, while the nut 14 is engaged with a threaded portion of the pintle which extends upwardly from the bearing socket. To secure the castor to the article, the threaded portions of the pintle can be screwed into a threaded opening in the article or can be passed through a plain hole in the article and held by means of a second nut. The nut 14 can be held by a spanner to facilitate fixing of the castor to the article. When the castor is so mounted the pintle 11 provides a vertical swivel axis for the castor.

Figure 2:
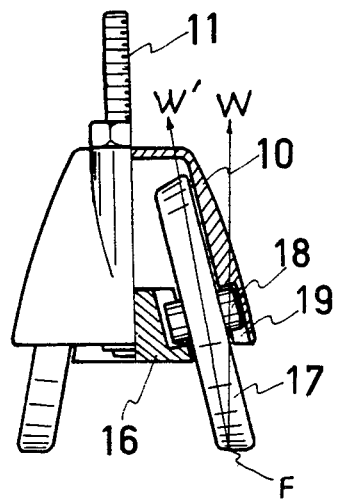
FIG. 2 is a sectional view of the castor.
Figure 3:
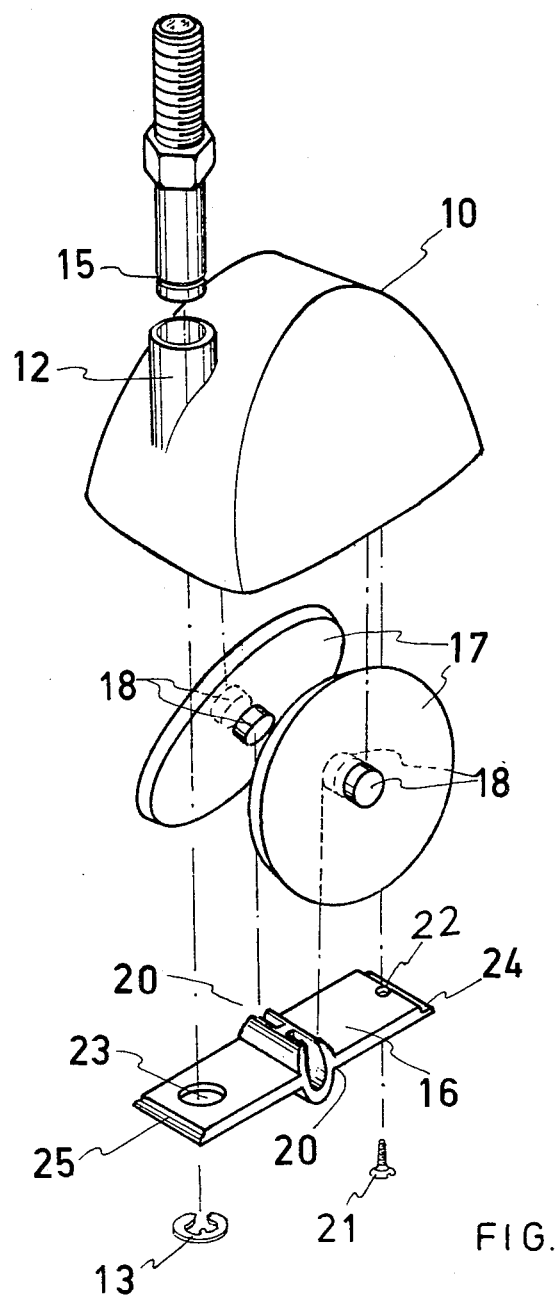
FIG. 3 is an exploded view.

The casing 10, in conjunction with a retainer plate 16 (FIG. 3), supports a pair of wheels 17. In this embodiment, the wheels are each formed integrally with a pair of trunnions 18, one of which is rotatably journalled in a corresponding bearing recess 19 machined into the inside wall surface of the casing and the other of which is journalled in a similar recess 20 formed in the retainer plate. As seen in FIG. 2, the recesses 18 and 19 face in opposite directions. The retainer plate 16 is fixed to the underside of the casing by means of a screw 21 which passes through a hole 22 at one end of the plate into a threaded hole (not shown) in the casing. The screw may be of the self-tapping kind. At the other end of the plate a hole 23 is formed which aligns with the bore of the socket 12 so that the grooved end of the pintle 11 passes through the hole 23 and the circlip 13 bears against the bottom of the plate to retain the pintle. Stepped portions 24 and 25 formed at the ends of the retainer plate cooperate with complementary recesses (not shown) formed in the inner wall surface of the casing to ensure correct positioning of the plate when assembled.

The wheels 17 are each cambered towards the vertical centre plane of the castor in the view shown in FIG. 2, wherein edges of the wheels are bevelled so that at their lowermost ground-containing points the wheel edges lie in a common plane. This centre plane contains the axis of the swivel pintle 11 and is also a plane of symmetry of the castor. The camber angle is preferably between 8° and 20°, and advantageously between 10° and 20°. In this embodiment this angle is approximately 15°. The swivel axis is offset forwardly of the wheel axes to avoid wheel locking during turning movements of the castor.

The direction of camber of the wheels is important to give stability to the castors. Compared with conventional swivel castors which do not have their wheels cambered, it has been found the castor described above has significantly improved stability and manouverability. Locking tendency, which can be particularly evident in conventional two-wheeled castors is significantly reduced with the present castor.

The symmetry of design provides eye-appeal as well as contributing to stability. The castor is easy to manufacture and tolerances are non-critical, particularly for the wheel bearings. Thus performance is not greatly impaired by wear. Assembly of the castor is relatively easy thereby contributing to low cost.

The bearing requirements are reduced because of the camber applied to the wheels. In this embodiment the camber angle is such in relation to the relative dimensions of the wheel and its supporting trunnions that the reaction component at F of a static load W supported by each wheel acts in a line which passes vertically through the bearing 19. This action provides stability to the castor when stationary or moving in a straight line. When cornering or suddenly changing direction the effective load W now acts at an angle which is normally less than the camber angle so that side thrust is minimised and stability is maintained.

The embodiment illustrated in the drawings is described by way of example only and variations in details of its construction are possible. For example, any suitable means for giving a swivel support may be provided, such as top bearing pintles for light furniture, expanding sleeve types for tubular equipment or ball bearing swivel bearings for heavy duty applications. The wheels may conveniently be mounted in plastics material or made of metal and fitted with rubber or plastics tires if desired. For reduced weight or material the wheels may be hollow. Also, while trunnions are used for the bearing support for the wheels in this embodiment, other method of support, such as the use of roller or plain axle bearings may be employed.

Particularly for industrial use, a brake may be provided. Advantageously, this is in the form of a wedge of friction material disposed between the upper portions of the wheels and attached to one end of a handle protruding through the casing. The handle is pivotally mounted on the casing so that downward movement of the free end of the handle, e.g. by means of the operator's foot, causes upward wedging movement of the friction material between the two wheels.

The claims defining the invention are as follows:

I claim:

1. A castor which comprises a pair of wheels rotatably supported by a support member, the wheels being rotatable about respective rotational axes, the support member being swivellable about an upstanding swivel axis;

each wheel having an inward angle of camber relative to a plane containing the swivel axis such that uppermost portions of the wheels are closer together than lowermost portions, said angles of camber of the wheels relative to the plane of the swivel axis being equal;

the support member comprising a casing defining a hollow cavity for receiving part of each said wheel, the hollow cavity having two opposed sides, each said wheel having first and second trunions on opposed sides thereof, a recess for rotatably receiving a respective first said trunnion being provided on each of said opposed sides of the cavity; and a retainer plate attached to the casing and passing between the wheels, the plate having a recess on each opposed side thereof for rotatably receiving a respective second said trunnion.

2. A castor according to claim 1, wherein the angles of camber of the wheels relative to the plane of the swivel axis are equal.

3. A castor according to claim 1, wherein the swivel axis lies forwardly of rotational axes of the wheels.

4. A castor according to claim 1, which further comprises a swivel pintle swivellably received in a bore in the casing defining said swivel axis, a lower end of the pintle being secured to one end of the retainer plate and a collar being provided about the pintle at a location above the casing.

5. A castor according to claim 4, wherein the lower end of the pintle comprises a groove and passes through a hole in the retainer plate, a circlip being received in the groove, so as in conjunction with said collar to secure the pintle to the retainer plate.

6. A castor according to claim 1, wherein the camber angle is between 8 and 20 degrees.

7. A castor according to claim 1, wherein edges of the wheels are bevelled so that at their lowermost ground-contacting points the wheel edges lie in a common plane.

* * * * *